United States Patent
Blayvas et al.

(10) Patent No.: US 10,002,471 B2
(45) Date of Patent: Jun. 19, 2018

(54) SYSTEMS AND METHODS FOR AUTONOMOUS VEHICLE NAVIGATION

(71) Applicant: ANTS TECHNOLOGY (HK) LIMITED., Wanchai (HK)

(72) Inventors: Ilya Blayvas, Jerusalem (IL); Ron Fridental, Shoham (IL); Shengwei Da, Shanghai (CN)

(73) Assignee: ANTS TECHNOLOGY (HK) LIMITED, Wanchai (HK)

( * ) Notice: Subject to any disclaimer, the term of this patent is extended or adjusted under 35 U.S.C. 154(b) by 366 days.

(21) Appl. No.: 14/949,919

(22) Filed: Nov. 24, 2015

(65) Prior Publication Data

US 2017/0090478 A1   Mar. 30, 2017

Related U.S. Application Data

(60) Provisional application No. 62/234,738, filed on Sep. 30, 2015.

(51) Int. Cl.
| | |
|---|---|
| *G01C 21/00* | (2006.01) |
| *G07C 5/08* | (2006.01) |
| *G01C 21/34* | (2006.01) |
| *G05D 1/00* | (2006.01) |
| *G05D 1/02* | (2006.01) |
| *G06Q 10/04* | (2012.01) |

(52) U.S. Cl.
CPC ....... *G07C 5/0808* (2013.01); *G01C 21/3453* (2013.01); *G05D 1/0005* (2013.01); *G05D 1/0217* (2013.01); *G06Q 10/04* (2013.01)

(58) Field of Classification Search
None
See application file for complete search history.

(56) References Cited

U.S. PATENT DOCUMENTS

| 6,567,743 B1 * | 5/2003 | Mueller | G01C 21/3446 701/467 |
|---|---|---|---|
| 7,050,905 B2 * | 5/2006 | Nemeth | G01C 21/3415 701/421 |
| 7,711,474 B2 * | 5/2010 | Mueller | G01C 21/3461 701/414 |
| 7,831,383 B2 * | 11/2010 | Oohashi | G01C 21/32 701/420 |
| 8,515,610 B2 * | 8/2013 | Sung | G05D 1/0223 701/23 |
| 9,640,079 B1 * | 5/2017 | Moravek | G08G 5/0013 |
| 9,714,831 B2 * | 7/2017 | Kapoor | G01C 21/00 |
| 2003/0149528 A1 * | 8/2003 | Lin | G01C 21/165 701/472 |

(Continued)

*Primary Examiner* — Truc M Do
(74) *Attorney, Agent, or Firm* — Soroker Agmon Nordman

(57) ABSTRACT

Disclosed is a system for automatically navigating a vehicle, which system comprises:
a data storage containing one or more maps of one or more areas;
electronic interfaces for: (i) receiving data relating to the one or more areas from external data sources; (ii) receiving parameters relating to motion of the vehicle from physical sensors; and (iii) receiving a location of the vehicle from a positioning device;
a navigation processor comprising processing circuitry adapted to determine an initial optimal route for traversing the vehicle from a given point in the one or more areas to another point in the one or more areas by computationally resolving a constrained minimization problem.

19 Claims, 9 Drawing Sheets

(56) References Cited

U.S. PATENT DOCUMENTS

| | | | |
|---|---|---|---|
| 2007/0203623 A1* | 8/2007 | Saunders | G05D 1/0206 701/23 |
| 2008/0033639 A1* | 2/2008 | Nakamura | G01C 21/32 701/532 |
| 2010/0030460 A1* | 2/2010 | Sawai | G01C 21/32 701/532 |
| 2010/0253597 A1* | 10/2010 | Seder | B60R 1/00 345/7 |
| 2013/0201316 A1* | 8/2013 | Binder | H04L 67/12 348/77 |
| 2013/0204528 A1* | 8/2013 | Okude | G08G 1/096822 701/533 |
| 2014/0032087 A1* | 1/2014 | Shiri | G06F 17/00 701/117 |
| 2015/0100179 A1* | 4/2015 | Alaniz | A63F 13/00 701/1 |
| 2015/0345966 A1* | 12/2015 | Meuleau | G01C 21/3453 701/23 |

* cited by examiner

SYSTEMS AND METHODS FOR AUTONOMOUS VEHICLE NAVIGATION

REFERENCES CITED

| [A1] | 8,930,059 | Neff | June 2015 | 701/23 | Driverless Vehicle |
| [A2] | 9,037,294 | Chung, et. al. | May 2015 | 700/253 | Robot cleaner and control method thereof |
| [A3] | 9,014,848 | Farlow et. al. | April 2015 | 700/245 | Mobile robot system |

[B1] L. Landau, E. Lifshitz; Course of Theoretical Physics, Volume 1 (Mechanics), ISBN: 978-0750628969; Butterworth-Heinemann, 1976

[B2] L. Landau, E. Lifshitz; Course of Theoretical Physics, Volume 6 (Fluid Mechanics), ISBN: 978-0750627672; Butterworth-Heinemann, 1987

[B3] B. Munson, A. Rothmayer, T. Okiishi, W. Huebsch; Fundamentals of Fluid Mechanics; ISBN: 978-1118116135; Wiley, 2012

[B4] FAR AIM 2015; ISBN: 978-1619541474; ASA, 2015

FIELD OF THE INVENTION

The present invention generally relates to the field of automated vehicle systems. More specifically, the present invention relates to systems and methods for autonomous vehicle navigation.

BACKGROUND

Progress in the fields of digital computing, communication as well as progress in the algorithms and systems of computer vision, sensing, navigation, control, mechanics, engines, results in the dawn of the new era of automatic navigation of various vehicle types without necessity of burdening the human.

Although some progress had been demonstrated in this field, there is much more to be done in order to implement truly autonomous, reliable and safe vehicle navigation.

SUMMARY OF THE INVENTION

The present invention includes Systems and Methods for Autonomous Vehicle Navigation. The disclosed architecture and algorithmic solutions allow autonomous vehicle navigation essentially without help and interference from the human driver.

The invention will be often illustrated and explained for the wheeled ground vehicle, such as private car, however the vehicle type and application are not limited by any specific type of vehicle, and also include, among others, wheeled cars, home robots, rotorcrafts, drones, walking vehicles, airplanes, boats, sailboats—actually any machine capable of controlled navigation, which is known today, or will be invented in the future.

The problem of autonomous navigation can be defined as the problem of displacement of the vehicle in the environment from certain initial position or start $\vec{X}_S$ to a certain final position or destination $\vec{X}_F$. For the sake of brevity, the $\vec{X}$ will usually denote a complete description of vehicles position in space and include both coordinates of its center of mass $\{x_1, x_2, x_3\}$ and the angles of its rotation relatively to some pre-selected coordinate system: $\vec{X}=\{x_1, x_2, x_3, \varphi_1, \varphi_2, \varphi_3\}$. The coordinates can be spatial coordinates in the Euclidian system, and the angles can be the angles of roll, pitch and yaw or the angles along the principle axes of the vehicle's moment of inertia. Other type of spatial coordinates and angles can be chosen for the sake of convenience, such as spherical coordinates, Euler Angles, quaternions, etc.

We will limit the discussion by the rigid-body description of the vehicle, however the disclosed inventions are also applicable to other types of vehicles, such as walking vehicles, or other vehicles that significantly change their shape and moments of inertia during their motion.

The vehicle is navigated from a start to destination along a certain path or trajectory, which can be described as a sequence of vehicle positions at certain moments of time, or, more accurately, as parametric dependence of vehicle position $\vec{X}$ on the time t: $\vec{X}=\vec{X}(t)$ The trajectory is calculated by the autonomous vehicle navigation system (also referred as 'vehicle navigation system', 'navigation system' or 'system') and updated or altered along the way upon necessity. The vehicle is moved by the force of its engine(s), via the actuators or motion controllers.

The engine(s) and actuators may differ among the different kinds of vehicles: for the wheeled car the controllers are the throttle, the gears, the steering of the wheels and the breaks; for the motor boat it is the thrust and direction of its motors, and the inclination of its rudder; for the sailboat it is the position of its sails respectively to the position and the magnitude of the wind, as well as respective boat and rudder directions, The motion controllers of the Quadcopter drone are its motors and propellers. The motion controllers of the airplane are thrust of its motor, rudder, elevators, ailerons, flaps.

Despite the obvious difference between different types of motion controllers for various types of vehicles, they have much in common—each motion controller applies a force onto a vehicle, which in turn translates the force into the change (or preservation) of vehicles speed and direction of motion.

The force applied by motion controller depends on the state of the controller, vehicle and the surrounding environment. For example the force applied by the engine of the car through the wheels depends on amount of torque of the engine, the gear between the engine and the drive wheels, and the friction between the wheels and the road; the force applied by the turning wheels onto the car depend on the car speed, inclination angle of the wheels and the friction between the wheels and the road; the force applied by the sailboat rudder or by the airplane control surfaces (e.g. rudder, elevators, ailerons, flaps) depends on their inclination angle and relative speed of the water or air flow, etc.

The exact value of the force projected onto the vehicle by motion controller is calculated from the physical model of that motion controller, model and measurement of the environment. Creation and maintenance of accurate physical models of the motion controllers and the local environment, and continuous update of these models by frequent measurement of the environment and force from motion controller allows accurate prediction of the vehicle motion and optimal solution of the navigation problem.

It is important to note, that the automatic driving system will increase the safety, efficiency and comfort of travel due to multiple reasons. The human drivers are prone to errors and attention distractions. The drivers vary in their driving skills, but even the best of them can't claim perfect calculation, planning and execution, and their reaction delay, the amount of information that they are capable to process and the accuracy of their judgment of multiple parameters of the vehicle, road, environment are by far inferior to those of the computers and electronic sensors.

Knowledge and application of physical models of the motion controllers and the vehicle environment, as well as further solving of the mechanical equations of motion for the vehicle allows to obtain the full extent of physically possible motions and trajectories of the vehicle. This in turn allows for search of truly optimal navigation paths among all the paths physically possible for a given vehicle, its controllers and environment.

Prior to discussing the optimal navigation path it is important to accurately define the optimality criteria. The optimality is formulated as a tradeoff between multiple factors, which are often mutually competing. For example optimal navigation may mean: safe to the passengers and people along the way; fast; complying to the road signs, traffic lights, the rules and limitations of the road; minimizing the cost; environmentally friendly; comfortable and with the nice view along the road.

The requirement of shorter time on the way may contradict a requirement of low fuel consumption and low cost of navigation. Many other factors are mutually influencing, and optimizing and perfecting the one of them will come on account of other factors. For example, the common fashion is to suggest some kind of "absolute 100%" safety to the passengers and people outside of the vehicle. However the claim that navigation can be performed with 100% safety is a dangerous hypocrisy, based on lack of understanding, and that will inevitably result in the heavy consequences. Consider the vehicle with the passengers inside moving from a start to the destination. Some other vehicle can strike into it, some bystander may jump under the wheels, a bridge over it or beneath it may collapse, and finally earthquakes, tsunamis, terror (which roots can't be described at the time of writing), thunder strikes and even falling meteorites can happen. So to be absolutely safe from certain accidents the vehicle's speed should not exceed a few kilometers per hour, to be absolutely safe from some other accidents the vehicle should stand still. Yet, the accidents such as earthquakes, thunderstorms meteorites and terror will still endanger the passengers.

One of the disclosed methods to solve the optimization problem is via construction of the cost function that combines the various measures of 'cost' of the trip:

$C=\int_{t_S}^{t_F}\Sigma_i C_i(t)dt$ (019A), which is the integral of cost function $C(t)=\Sigma_i C_i(t)$ (019B) over time t from the start time of the navigation $t_S$ till the final time of the navigation $t_F$.

According to some embodiments of the present invention, the components cost function encode the safety, comfort, fuel consumption, cost and travel time with the weights proportional to the importance of the component. Some estimates such as fuel consumptions and travel time are well known functions of speed and can be calculated fairly accurately, other estimates such as travel comfort, and cost of vehicle amortization due to certain vehicle stress are calculated as the functions of accelerations, road paving and speed etc., yet some other estimates such as safety as a function of speed, road, traffic, time of day, illumination, etc. can be done from the known statistics and approximate modelling of the accident probabilities as the functions of the above listed factors.

According to some embodiments of the present invention, the speed limit may be also a factor of law enforcement regulation, in which case there is a component in the cost function, which has zero value for the speeds below the legal limit, and sharp rising for the speeds above the legal limit.

According to some embodiments of the present invention, since the cost function already has a component reflecting the safety of the trip, the value of legal speed component need not take infinite values just above the legal limit of speed, but rather adequate high and rising values, evaluating amount of possible fines and other legal punishments. After all, there are some situations where the legal speed limit should be somewhat exceeded—in the case of driving the medical emergency patient to the hospital, or in the case of overtaking of another car in the opposite lane—during movement on the opposite lane the safety risk rises sharply, and therefore in order to minimize the overall cost function the time on the opposite lane should be decreased, which might be attainable by slight exceeding of the legal speed limit. With the legal speed limit of 55 mph, overtaking of the car moving 50 mph at 55 mph during 30 seconds on the opposite lane might induce higher overall risk than overtaking it at 60 mph during 15 seconds.

For the case of airplane navigation the speed is limited from below by the stall speed, and from above by the maximum structural safety speed limits; the navigation route is limited by airspaces, aviation rules, air traffic control etc. For the case of marine navigation of ships, boats, sailboats etc.—by appropriate marine rules, charts and services.

According to some embodiments of the present invention, the navigation system proceeds as follows: After receiving the destination request, the system plans the general route. The initial planning of an optimal path is similar to what the modern satellite navigator systems are doing—i.e. they are planning the route from the start to the destination. The difference with the conventional navigator systems is that the path is planned optimizing the overall cost function—including the safety of the journey, and expenses over the fuel, vehicle etc.; also the planned path will include the markings along the way of the expected vehicle speed.

According to some embodiments of the present invention, the planning stage can be similar to modern navigation aid systems, which are planning to shortest path. Some optional novel features exist in the disclosed system: the destination request can come along with further mission description or attributes, which are translated into the cost function (019B). For example for urgent medical evacuation the cost of time delays will be higher than for recreational voyage. The route is planned to minimize the expected overall cost function, taking into account considerations of safety, time, cost, and other possible factors.

According to some embodiments of the present invention, after the route is planned, it is divided into the short sections, "digestible" for driving. These are the sections of the route which are directly observable by the monitoring cameras and sensors. The motion of the vehicle is started, and the further vehicle control, until reaching the destination is incremental and iterative approach, where the speed magnitude and direction are altered by the vehicle motion actuators according to the real time information obtained from the sensors, traffic control, other vehicles, weather reports and other information sources.

According to some embodiments of the present invention, there are two basic actions iteratively performed by the system: (1) navigation along the planned path (2) reaction to interrupts.

According to some embodiments of the present invention, for navigation along the path, the appropriate section of the path starting from the current vehicle location, and ended at some sufficient distance along the path, depending by the range of sensors, vehicle speed and other factors is iteratively selected.

According to some embodiments of the present invention, the detailed desired trajectory along the current section of the path is calculated. It is calculated to continue the current vehicle speed and direction, and minimizing the cost function (019B), taking into account the constraints of the path and local environment, information from sensors perceiving the path, environment, vehicle, passengers and load, legal requirements on the speed and location, physical limitations of the vehicle and its motion actuators, and considerations of safety, speed, comfort and price of the path.

According to some embodiments of the present invention, after the detailed desired trajectory along the current section is calculated, the vehicle actual trajectory is measured by periodic verification of vehicle's speed and position (these updates and verifications are performed at the appropriate sampling rate, typically at the frequencies between 1 Herz to 1000 Herz). The difference between the actual position and the desired trajectory are processed, contributing to both correction actions of motion actuators and update and modification of the desired trajectory.

According to some embodiments of the present invention, the trajectory in space is routed according to the selected destination, physical constraints of the navigation space, and physical limitations of the vehicle. For example, the path for the wheeled vehicle is routed along the appropriate roads; the trajectory for the airplane—along the appropriate air traffic routes, taking into account airspace rules, air traffic, weather, latest updates from traffic control, physical properties and limitations of the airplane etc.; similarly the route for the ship or boat is constructed according the navigation maps, weather forecasts, traffic patterns etc.

In addition to moving the vehicle along the constructed route, as described above, the navigation system has another important functionality, which is interactive reaction to changes and arising situations.

Many different road interrupts requiring 'immediate' response in vehicle control can arise: traffic lights, road signs, other vehicles crossing the way, pedestrians or animals crossing the way or even jumping onto the road, and various dangerous situations, related to mistakes of other drivers, pedestrians, failures in the navigated vehicle, nearby vehicles, road infrastructure, accidents etc.

According to some embodiments of the present invention, despite the apparent versatility of multiple possible road interrupts, they have very much in common, and can be tackled by the following scheme:

Continuously look for the new road interrupt. The road interrupt is an event of change of the environment such that the planned motion along the latest planned route will result in collision or endangering of the vehicle, its passengers or people, animals or property outside the vehicle. Upon detection of the road interrupt, the system calculates the optimal reaction that eliminates or minimizes the 'cost', and performs it. The criteria of optimality for the trajectory change may include the safety of the passengers and people, safety of the vehicle and surrounding vehicles and property, traffic rules and prescriptions, comfort of the passengers, time and cost of travel, etc. The optimal change of the trajectory can be calculated by solution of the constrained minimization problem where the criteria of optimality are included into the cost function, and the solutions are constrained by physical limitations of the vehicle capabilities, navigation space and traffic rules, and physical environment. Upon calculation of the optimal change of the vehicle trajectory and route, they are updated and further vehicle motion is executed along the updated trajectory.

Successful response to some challenging road interrupts may require engagement of the maximum physical capabilities of the vehicle in order to avoid injury or damage. In these situations suboptimal vehicle performance will result in suboptimal solution. The examples, to list a few:

Sudden jump of an animal into a road crossing the vehicle's path, too close to the vehicle to allow the full stop before an impact, which may be cured by appropriate sharp steering. Too little steering will leave high probability of the impact, while too much steering will cause the skid or overturn of the vehicle;

Rupture of the forward tire during the sharp turn at high speed requires update of the physical model of the vehicle, and simultaneous application of the breaks and turn, in the proper extent in order to stay in the lane, or, at least, minimize the damage of rolling out of the lane.

Inevitably, in some cases even the best optimal solution possible under the laws of physics, given the current vehicle capabilities, road conditions, speed and location of all the participants will result in damage to the vehicle and even endanger the health and lives of the participants. However even in these unfortunate cases there are still the well-defined optimality criteria—minimum risk to the human lives, and damage to the property.

Optimal steering of the vehicle, especially in the reacting to emergency road interrupts, require accurate vehicle model, including model updates for the damaged vehicle: the vehicle with exploded tire has different friction with the road, however it still has to be steered in the controllable way until it is safely stopped on the road shoulders, or in appropriate safe location.

Thus, according to some embodiments of the present invention, we reduced the problem of automatic driver-less vehicle navigation into the following: (1) Obtain the start point (1a), the destination point (1 b) and the mission priorities (1c). (2) From the mission priorities and prior data, vehicle and environment and traffic model, weather and traffic updates construct the cost function (2a), reflecting the priorities and the available information. (3) Find the optimal path (3a) minimizing the cost function (2a). (4) Drive the vehicle along the optimal path (3a) applying vehicle motion controllers to minimize the cost function (2a). (4) Monitor the environment, and vehicle and maintain the communication in order to timely detect any road interrupt (4a) requiring reaction in driving of the vehicle (4b), or change of the navigation path (4c). (5) Calculate the optimal reaction to a detected road interrupt (4a), minimizing the cost function by solving the equations of motion of the vehicle.

Now let us consider in more details the physical model of the vehicle and its equations of motion. Initial position or start $\vec{X}_S$, to a certain final position or destination $\vec{X}_F$. The position of the vehicle in space is defined by its spatial position $\vec{X}=\{x, y, z\}$ of its center of mass, and angular position $\vec{\Phi}=\{\varphi_1, \varphi_2, \varphi_3\}$ of its rotation relatively to some pre-selected coordinate.

The speed of the vehicle $\vec{V}$ is defined as the derivative of its coordinates with respect to time:

$$\vec{V}(t) = \frac{d\vec{X}(t)}{dt},$$

note that this definition applies to both linear speeds and angular rotational speeds.

Time derivative of vehicle's momentum equals to the net sum of the forces:

$$\frac{d\vec{P}}{dt} = \Sigma_i \vec{f_i}, \quad (44a)$$

Where the momentum is the sum over independent parts of the vehicle and its load, multiplied by their respective speeds: $\vec{P} = \Sigma_i m_i \vec{V_i}$;

For the vehicles possessing rigid construction and the load which movement and displacements relatively to the vehicle are negligible, the rigid body approximation is valid: $\vec{P} = M\vec{V}$; where $M = \Sigma_i m_i$ is the total mass of the vehicle and its load, and $\vec{V}$—is the speed of its center of mass. Note that by scalar M we denote the mass, and by vector $\vec{M}$ the angular momentum. For the vehicles that change their shape and mass distribution, the equations of motion must be applied separately to each moving part of the vehicle and load system.

The angular momentum of the vehicle $\vec{M}$ is defined as $\vec{M} = I\vec{\Omega}$ (47), where $$I = \begin{bmatrix} \Sigma m(y^2 + z^2) & -\Sigma mxy & -\Sigma mxz \\ -\Sigma mxy & \Sigma m(x^2 + z^2) & -\Sigma myz \\ -\Sigma mzx & -\Sigma mzy & \Sigma m(x^2 + y^2) \end{bmatrix} \quad (48a)$$

is the inertia tensor and $$\vec{\Omega} = \frac{d\vec{\Phi}}{dt} = \left\{ \frac{d\varphi_1}{dt}, \frac{d\varphi_2}{dt}, \frac{d\varphi_3}{dt} \right\} \quad (49a)$$

is its angular velocity.

The time derivative of the angular momentum $\vec{M}$ equals to the net toque $\vec{K}$ applied to the body:

$$\frac{d\vec{M}}{dt} = \vec{K}; \quad (50a)$$

where the torque is the sum of vector products of all applied forces by vectors towards the point of their application: $\vec{K} = \Sigma \vec{r} \times \vec{f}$ (50b).

The equations presented above describe the motion of the vehicle and can be used to predict its trajectory, and search for optimal control.

However we did not define the specific forces referred in equations (44a) and (50a) and applied by motion actuator on the vehicle.

In the above generic description of the automatic driving system, the default example for consideration was driving of the wheeled car. However the disclosed invention is applicable to automatic driving and driver assistance of many different vehicles and machines capable to of controlled change their position in space. On the system level, the main differences between various types of vehicles and transportation means are the following:

(1) Different transportation media—road; air; water;

(2) Different vehicle types, modes of motion, rules and constrains;

(3) Different forces acting on motion actuators and physical models of the actuators and the vehicle.

Let us now consider some of the functionality of automatic navigation system for the cars. Many examples will be given for a four wheeled private car, operating on the public roads. However the application domain of the disclosed invention is not limited by a car type and environment. It includes other types of the transport operating moving over the ground, such as: tracks, agriculture machines, armored vehicles and tanks, wheeled, tracked and legged machines.

Among the tasks which can be implemented in the system are recognition of the Road signs and traffic lights; recognition of the road, its shoulders, traffic direction, obstacles and bumps, speed limits, car signal lights—turns, breaks; pedestrians and animals crossing, road interrupts which are the situations requiring immediate change in the speed and or steering; Communication systems used in the autonomous navigation system may include GPS system, GLONASS and other satellite navigation systems, radio traffic and weather updates, car to car, car to road infrastructure communication.

For these cases motion actuators of the vehicle are based mostly on the friction with the road or surface. Air and wind usually have secondary and less important influence, except for high speeds of the car and strong winds. For the legged walking machines—the reaction between the legs and surface, friction, maximum force supported by the leg should be evaluated from the microenvironment model, surface model, friction measurement and estimation, load on the leg can be calculated or measured by built in sensors; change of moment of inertia, center of mass, shape and moments of forces applied to the vehicle due leg extension and evaluated and considered in the equations of motion.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It comprises blocks for physical models of the vehicle, environment, driver and vehicle control, as well as the blocks representing the sensors monitoring vehicle, environment, driver, and vehicle controllers.

Figure 2:
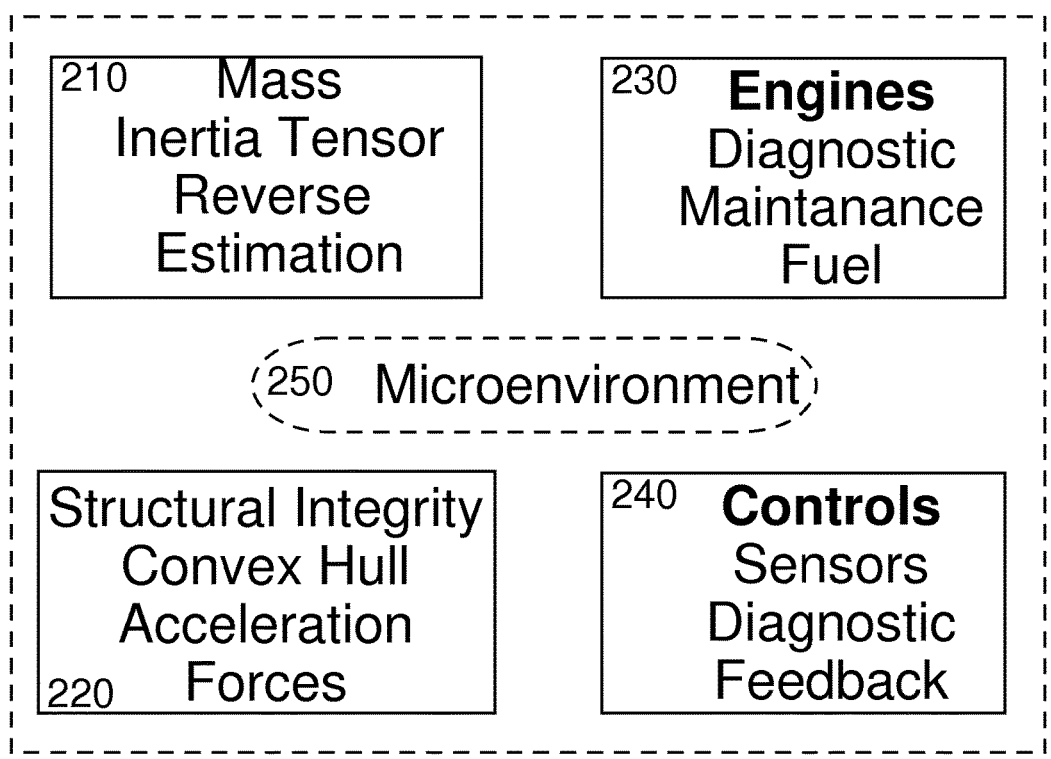

FIG. 2 represents a block diagram of an exemplary physical model of the vehicle and its diagnostic sensors.

Figure 3:
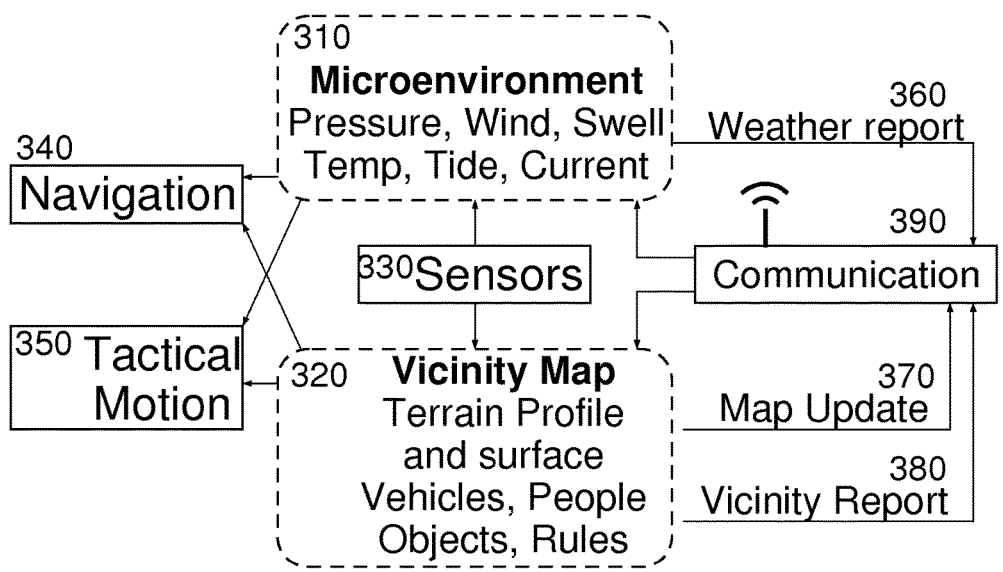

FIG. 3 shows a block diagram of an exemplary environment and microenvironment physical model and measuring sensors.

Figure 4:
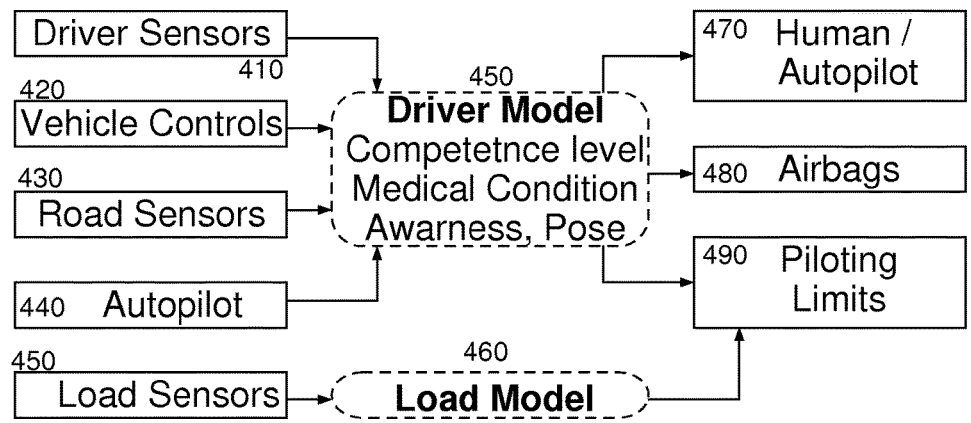

FIG. 4 shows an exemplary Driver and exemplary load safety model and diagnostic sensors.

Figure 5:
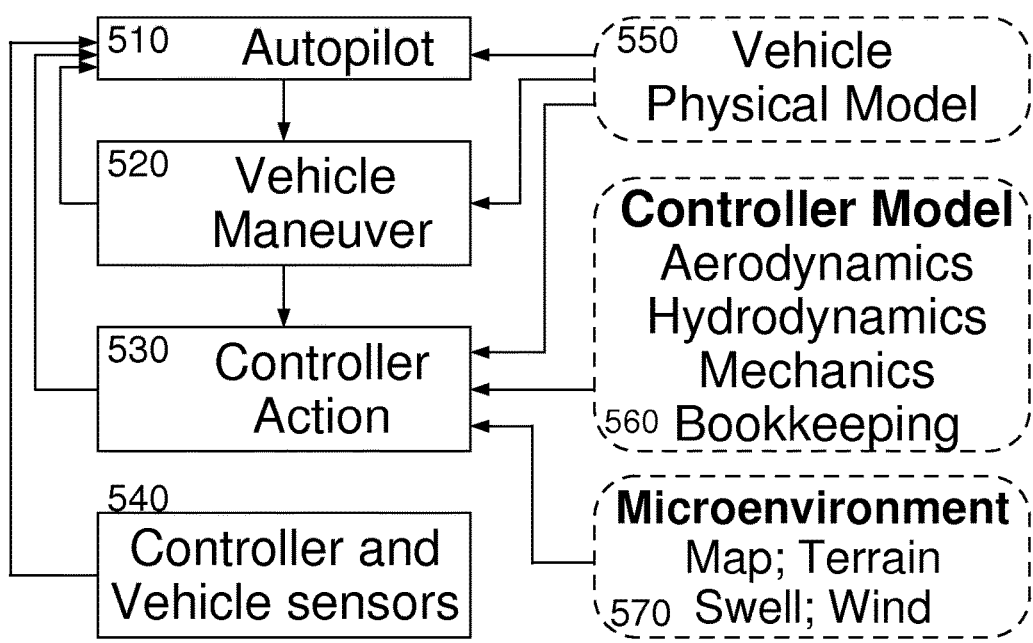

FIG. 5 shows an exemplary Vehicle controller model and vehicle controllers' sensors.

Figure 6:
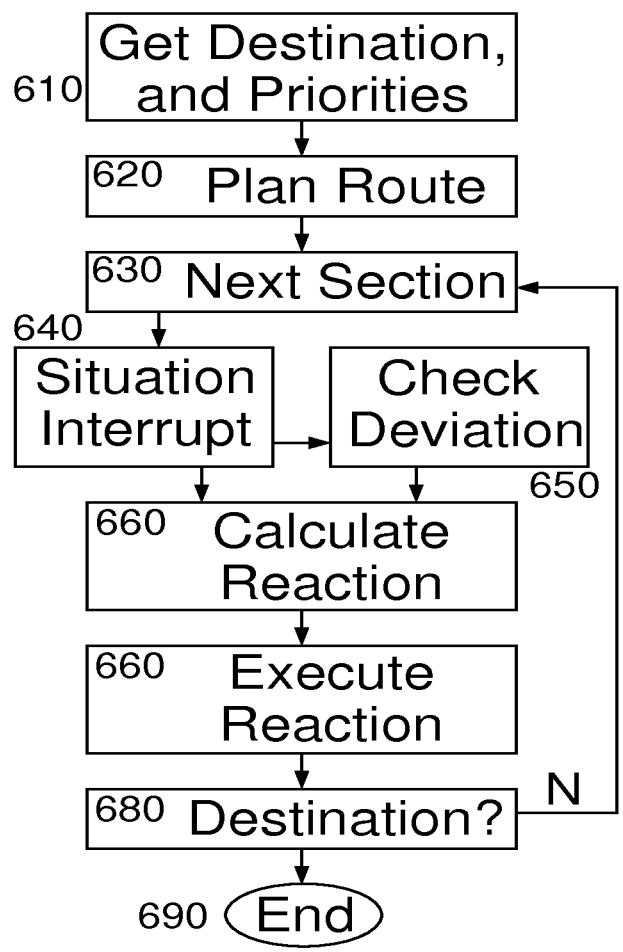

FIG. 6 shows a generic execution flowchart of an exemplary automatic driving system.

Figure 7:
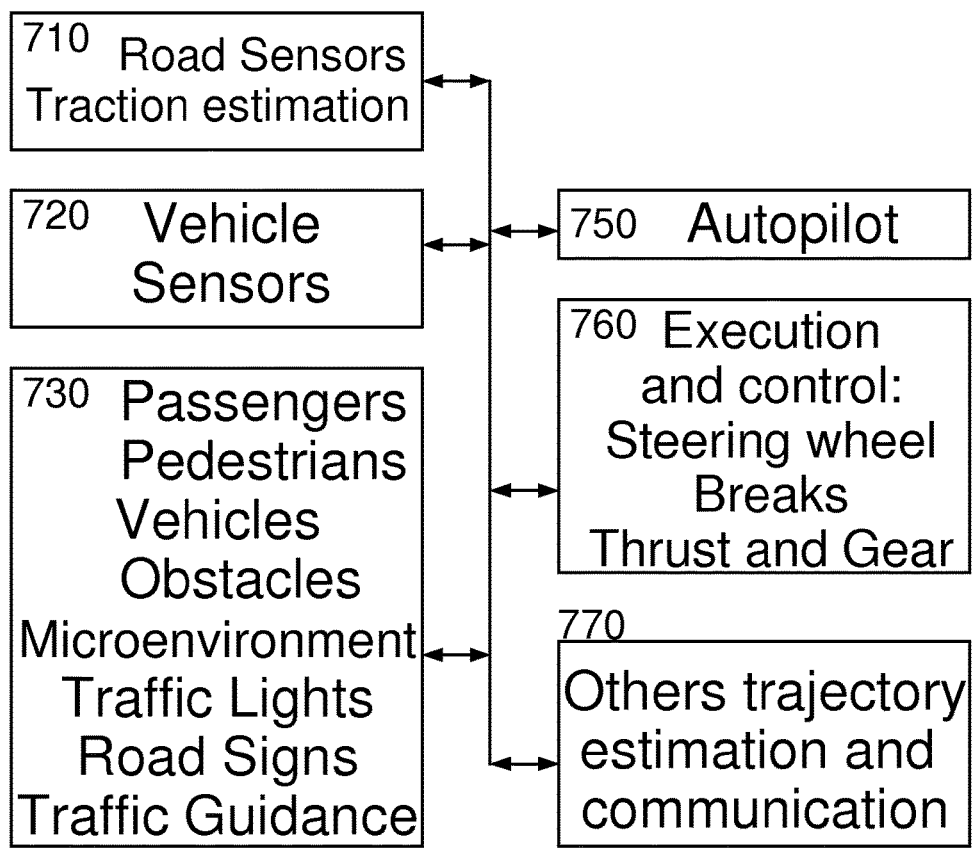

FIG. 7 shows some of the blocks of an exemplary automatic driving system implementing the control of the wheeled passenger car.

Figure 8:
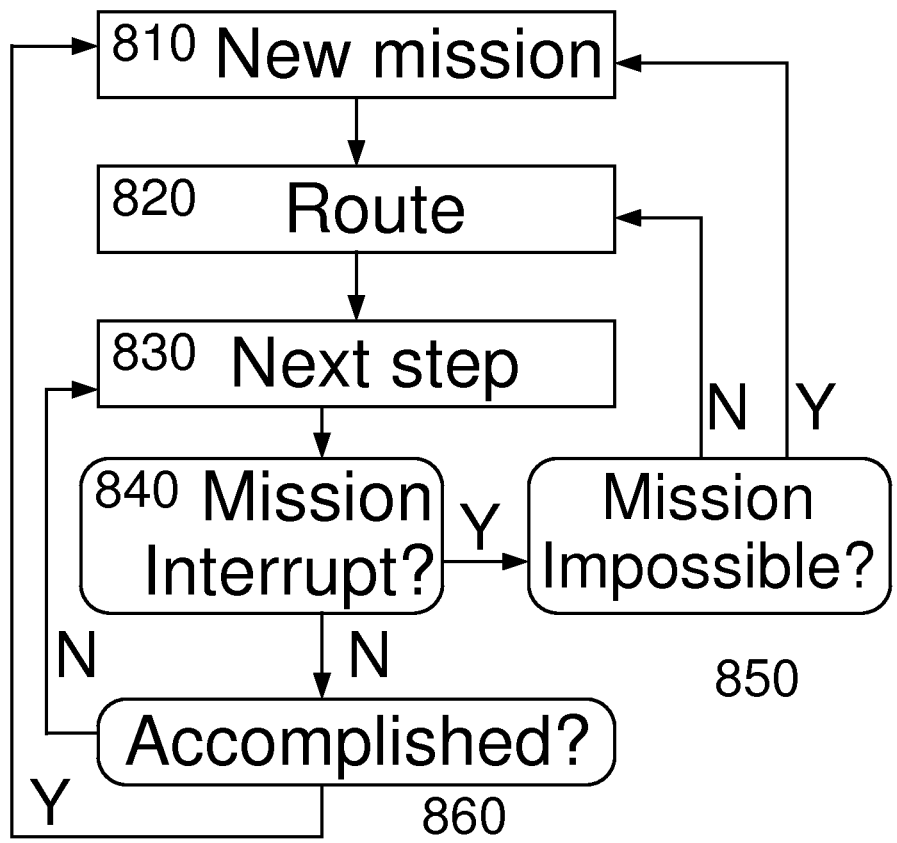

FIG. 8 shows some of the blocks of an exemplary automatic driving system implementing the control of the home robot.

Figure 9:
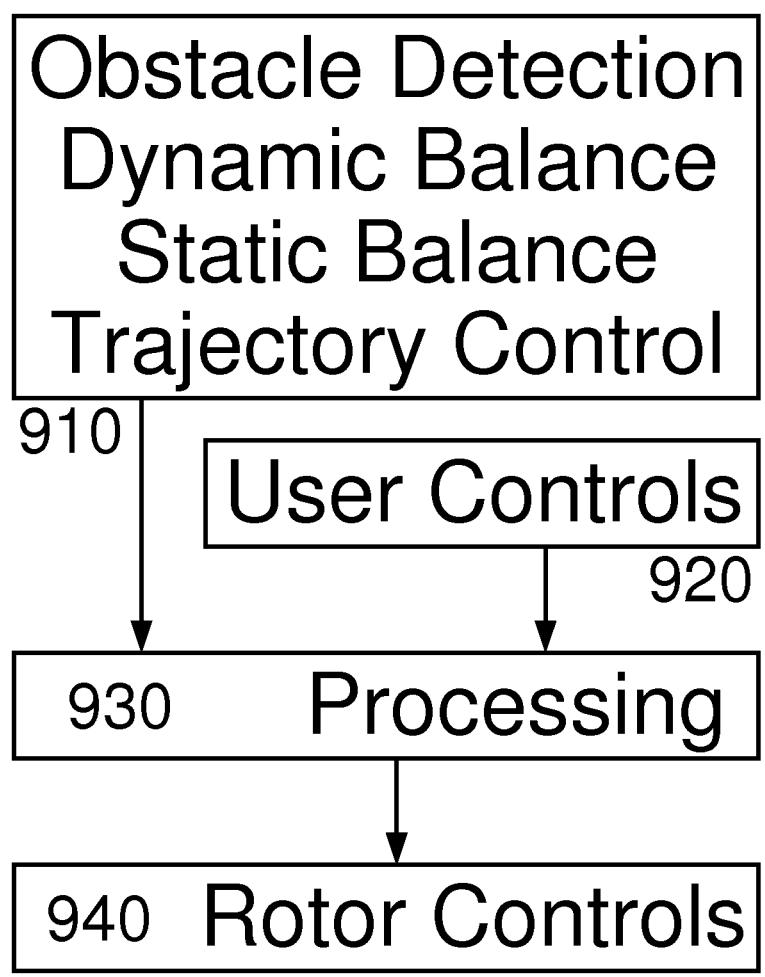

FIG. 9 shows some of the blocks of an exemplary automatic driving system implementing control of a drone.

Figure 10:
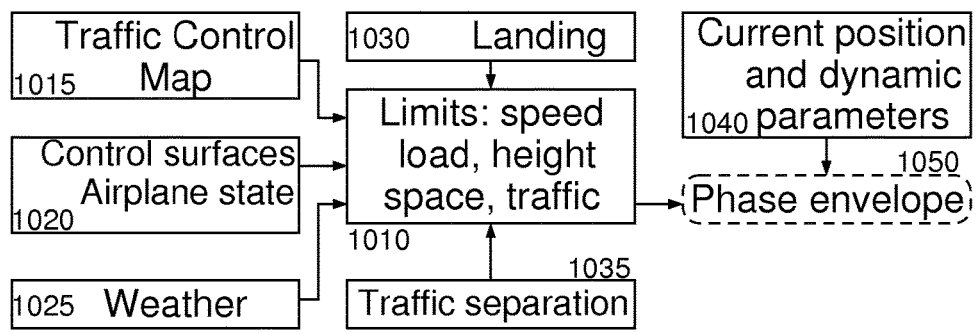

FIG. 10 shows some of the blocks of an exemplary automatic driving system implementing control of an airplane.

Figure 11:
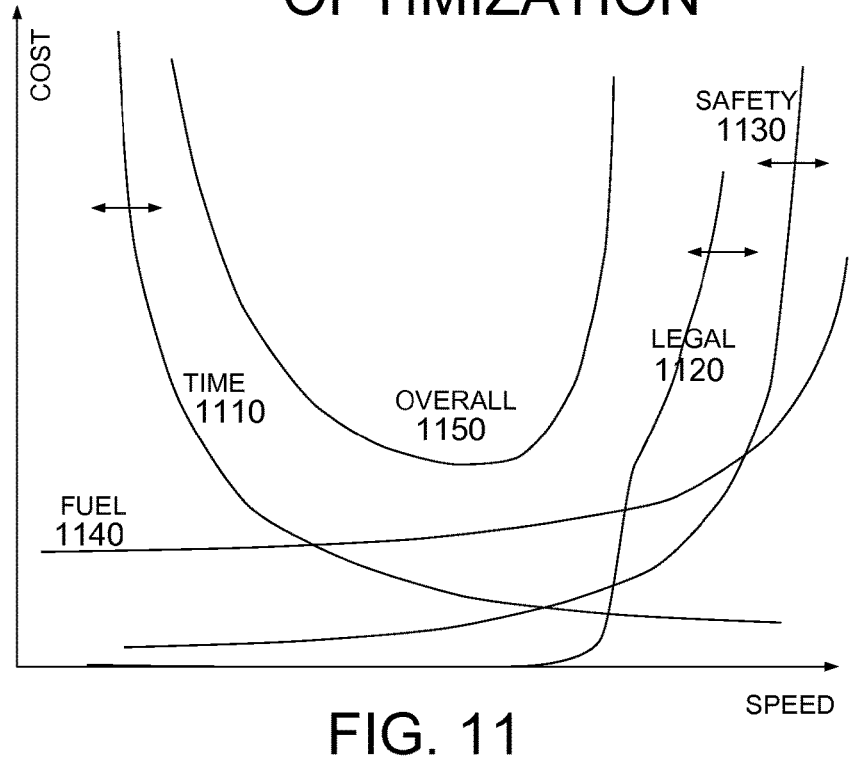

FIG. 11 illustrates an exemplary mechanism of search for optimal navigation solutions on the example of the cost functions drawn as a function of vehicle speed.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including hard disc drives, Solid State Drives, flash memory, random access memories (RAMs), or any other type of media suitable for storing electronic instructions.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention includes Systems and Methods for Autonomous Vehicle Navigation. The disclosed architecture and algorithmic solutions allow autonomous vehicle navigation essentially without help and interference from the human driver.

The invention will be often illustrated and explained for the wheeled ground vehicle, such as private car, however the vehicle type and application are not limited by any specific type of vehicle, and also include, among others, wheeled cars, home robots, rotorcrafts, drones, walking vehicles, airplanes, boats, sailboats—actually any machine capable of controlled navigation, which is known today, or will be invented in the future.

The problem of autonomous navigation can be defined as the problem of displacement of the vehicle in the environment from certain initial position or start $\vec{X}_S$ to a certain final position or destination $\vec{X}_F$. For the sake of brevity, the $\vec{X}$ will usually denote a complete description of vehicles position in space and include both coordinates of its center of mass $\{x_1, x_2, x_3\}$ and the angles of its rotation relatively to some pre-selected coordinate system: $\vec{X} = \{x_1, x_2, x_3, \varphi_1, \varphi_2, \varphi_3\}$. The coordinates can be spatial coordinates in the Euclidian system, and the angles can be the angles of roll, pitch and yaw or the angles along the principle axes of the vehicle's moment of inertia. Other type of spatial coordinates and angles can be chosen for the sake of convenience, such as spherical coordinates, Euler Angles, quaternions, etc.

We will limit the discussion by the rigid-body description of the vehicle, however the disclosed inventions are also applicable to other types of vehicles, such as walking vehicles, or other vehicles that significantly change their shape and moments of inertia during their motion.

The vehicle is navigated from a start to destination along a certain path or trajectory, which can be described as a sequence of vehicle positions at certain moments of time, or, more accurately, as parametric dependence of vehicle position $\vec{X}$ on the time t: $\vec{X} = \vec{X}(t)$ The trajectory is calculated by the autonomous vehicle navigation system (also referred as 'vehicle navigation system', 'navigation system' or 'system') and updated or altered along the way upon necessity. The vehicle is moved by the force of its engine(s), via the actuators or motion controllers.

The engine(s) and actuators may differ among the different kinds of vehicles: for the wheeled car the controllers are the throttle, the gears, the steering of the wheels and the breaks; for the motor boat it is the thrust and direction of its motors, and the inclination of its rudder; for the sailboat it is the position of its sails respectively to the position and the magnitude of the wind, as well as respective boat and rudder directions, The motion controllers of the Quadcopter drone are its motors and propellers. The motion controllers of the airplane are thrust of its motor, rudder, elevators, ailerons, flaps.

Despite the obvious difference between different types of motion controllers for various types of vehicles, they have much in common—each motion controller applies a force onto a vehicle, which in turn translates the force into the change (or preservation) of vehicles speed and direction of motion.

The force applied by motion controller depends on the state of the controller, vehicle and the surrounding environment. For example the force applied by the engine of the car through the wheels depends on amount of torque of the engine, the gear between the engine and the drive wheels, and the friction between the wheels and the road; the force applied by the turning wheels onto the car depend on the car speed, inclination angle of the wheels and the friction between the wheels and the road; the force applied by the sailboat rudder or by the airplane control surfaces (e.g. rudder, elevators, ailerons, flaps) depends on their inclination angle and relative speed of the water or air flow, etc.

The exact value of the force projected onto the vehicle by motion controller is calculated from the physical model of that motion controller, model and measurement of the environment. Creation and maintenance of accurate physical models of the motion controllers and the local environment, and continuous update of these models by frequent measurement of the environment and force from motion controller allows accurate prediction of the vehicle motion and optimal solution of the navigation problem.

It is important to note, that the automatic driving system will increase the safety, efficiency and comfort of travel due to multiple reasons. The human drivers are prone to errors and attention distractions. The drivers vary in their driving skills, but even the best of them can't claim perfect calculation, planning and execution, and their reaction delay, the amount of information that they are capable to process and the accuracy of their judgment of multiple parameters of the vehicle, road, environment are by far inferior to those of the computers and electronic sensors.

Knowledge and application of physical models of the motion controllers and the vehicle environment, as well as further solving of the mechanical equations of motion for the vehicle allows to obtain the full extent of physically possible motions and trajectories of the vehicle. This in turn allows for search of truly optimal navigation paths among all the paths physically possible for a given vehicle, its controllers and environment.

Prior to discussing the optimal navigation path it is important to accurately define the optimality criteria. The optimality is formulated as a tradeoff between multiple factors, which are often mutually competing. For example optimal navigation may mean: safe to the passengers and people along the way; fast; complying to the road signs, traffic lights, the rules and limitations of the road; minimizing the cost; environmentally friendly; comfortable and with the nice view along the road.

The requirement of shorter time on the way may contradict a requirement of low fuel consumption and low cost of navigation. Many other factors are mutually influencing, and optimizing and perfecting the one of them will come on account of other factors. For example, the common fashion is to suggest some kind of "absolute 100%" safety to the passengers and people outside of the vehicle. However the claim that navigation can be performed with 100% safety is a dangerous hypocrisy, based on lack of understanding, and that will inevitably result in the heavy consequences. Consider the vehicle with the passengers inside moving from a start to the destination. Some other vehicle can strike into it, some bystander may jump under the wheels, a bridge over it or beneath it may collapse, and finally earthquakes, tsunamis, terror (which roots can't be described at the time of writing), thunder strikes and even falling meteorites can happen. So to be absolutely safe from certain accidents the vehicle's speed should not exceed a few kilometers per hour, to be absolutely safe from some other accidents the vehicle should stand still. Yet, the accidents such as earthquakes, thunderstorms meteorites and terror will still endanger the passengers.

One of the disclosed methods to solve the optimization problem is via construction of the cost function that combines the various measures of 'cost' of the trip:
$C=\int_{t_S}^{t_F} \Sigma_i C_i(t)dt$ (019A), which is the integral of cost function $C(t)=\Sigma_i C_i(t)$ (019B) over time t from the start time of the navigation $t_S$ till the final time of the navigation $t_F$.

According to some embodiments of the present invention, the components cost function encode the safety, comfort, fuel consumption, cost and travel time with the weights proportional to the importance of the component. Some estimates such as fuel consumptions and travel time are well known functions of speed and can be calculated fairly accurately, other estimates such as travel comfort, and cost of vehicle amortization due to certain vehicle stress are calculated as the functions of accelerations, road paving and speed etc., yet some other estimates such as safety as a function of speed, road, traffic, time of day, illumination, etc. can be done from the known statistics and approximate modelling of the accident probabilities as the functions of the above listed factors.

According to some embodiments of the present invention, the speed limit may be also a factor of law enforcement regulation, in which case there is a component in the cost function, which has zero value for the speeds below the legal limit, and sharp rising for the speeds above the legal limit.

According to some embodiments of the present invention, since the cost function already has a component reflecting the safety of the trip, the value of legal speed component need not take infinite values just above the legal limit of speed, but rather adequate high and rising values, evaluating amount of possible fines and other legal punishments. After all, there are some situations where the legal speed limit should be somewhat exceeded—in the case of driving the medical emergency patient to the hospital, or in the case of overtaking of another car in the opposite lane—during movement on the opposite lane the safety risk rises sharply, and therefore in order to minimize the overall cost function the time on the opposite lane should be decreased, which might be attainable by slight exceeding of the legal speed limit. With the legal speed limit of 55 mph, overtaking of the car moving 50 mph at 55 mph during 30 seconds on the opposite lane might induce higher overall risk than overtaking it at 60 mph during 15 seconds.

For the case of airplane navigation the speed is limited from below by the stall speed, and from above by the maximum structural safety speed limits; the navigation route is limited by airspaces, aviation rules, air traffic control etc. For the case of marine navigation of ships, boats, sailboats etc.—by appropriate marine rules, charts and services.

According to some embodiments of the present invention, the navigation system proceeds as follows: After receiving the destination request, the system plans the general route. The initial planning of an optimal path is similar to what the modern satellite navigator systems are doing—i.e. they are planning the route from the start to the destination. The difference with the conventional navigator systems is that the path is planned optimizing the overall cost function—including the safety of the journey, and expenses over the fuel, vehicle etc.; also the planned path will include the markings along the way of the expected vehicle speed.

According to some embodiments of the present invention, the planning stage can be similar to modern navigation aid systems, which are planning to shortest path. Some optional novel features exist in the disclosed system: the destination request can come along with further mission description or attributes, which are translated into the cost function (019B). For example for urgent medical evacuation the cost of time delays will be higher than for recreational voyage. The route is planned to minimize the expected overall cost function, taking into account considerations of safety, time, cost, and other possible factors.

According to some embodiments of the present invention, after the route is planned, it is divided into the short sections, "digestible" for driving. These are the sections of the route which are directly observable by the monitoring cameras and sensors. The motion of the vehicle is started, and the further vehicle control, until reaching the destination is incremental and iterative approach, where the speed magnitude and direction are altered by the vehicle motion actuators according to the real time information obtained from the sensors, traffic control, other vehicles, weather reports and other information sources.

According to some embodiments of the present invention, there are two basic actions iteratively performed by the system: (1) navigation along the planned path (2) reaction to interrupts.

According to some embodiments of the present invention, for navigation along the path, the appropriate section of the path starting from the current vehicle location, and ended at some sufficient distance along the path, depending by the range of sensors, vehicle speed and other factors is iteratively selected.

According to some embodiments of the present invention, the detailed desired trajectory along the current section of the path is calculated. It is calculated to continue the current vehicle speed and direction, and minimizing the cost function (019B), taking into account the constraints of the path and local environment, information from sensors perceiving the path, environment, vehicle, passengers and load, legal requirements on the speed and location, physical limitations of the vehicle and its motion actuators, and considerations of safety, speed, comfort and price of the path.

According to some embodiments of the present invention, after the detailed desired trajectory along the current section is calculated, the vehicle actual trajectory is measured by periodic verification of vehicle's speed and position (these updates and verifications are performed at the appropriate sampling rate, typically at the frequencies between 1 Herz to 1000 Herz). The difference between the actual position and the desired trajectory are processed, contributing to both correction actions of motion actuators and update and modification of the desired trajectory.

According to some embodiments of the present invention, the trajectory in space is routed according to the selected destination, physical constraints of the navigation space, and physical limitations of the vehicle. For example, the path for the wheeled vehicle is routed along the appropriate roads; the trajectory for the airplane—along the appropriate air traffic routes, taking into account airspace rules, air traffic, weather, latest updates from traffic control, physical properties and limitations of the airplane etc.; similarly the route for the ship or boat is constructed according the navigation maps, weather forecasts, traffic patterns etc.

In addition to moving the vehicle along the constructed route, as described above, the navigation system has another important functionality, which is interactive reaction to changes and arising situations.

Many different road interrupts requiring 'immediate' response in vehicle control can arise: traffic lights, road signs, other vehicles crossing the way, pedestrians or animals crossing the way or even jumping onto the road, and various dangerous situations, related to mistakes of other drivers, pedestrians, failures in the navigated vehicle, nearby vehicles, road infrastructure, accidents etc.

According to some embodiments of the present invention, Despite the apparent versatility of multiple possible road interrupts, they have very much in common, and can be tackled by the following scheme:

Continuously look for the new road interrupt. The road interrupt is an event of change of the environment such that the planned motion along the latest planned route will result in collision or endangering of the vehicle, its passengers or people, animals or property outside the vehicle. Upon detection of the road interrupt, the system calculates the optimal reaction that eliminates or minimizes the 'cost', and performs it. The criteria of optimality for the trajectory change may include the safety of the passengers and people, safety of the vehicle and surrounding vehicles and property, traffic rules and prescriptions, comfort of the passengers, time and cost of travel, etc. The optimal change of the trajectory can be calculated by solution of the constrained minimization problem where the criteria of optimality are included into the cost function, and the solutions are constrained by physical limitations of the vehicle capabilities, navigation space and traffic rules, and physical environment. Upon calculation of the optimal change of the vehicle trajectory and route, they are updated and further vehicle motion is executed along the updated trajectory.

Successful response to some challenging road interrupts may require engagement of the maximum physical capabilities of the vehicle in order to avoid injury or damage. In these situations suboptimal vehicle performance will result in suboptimal solution. The examples, to list a few:

Sudden jump of an animal into a road crossing the vehicle's path, too close to the vehicle to allow the full stop before an impact, which may be cured by appropriate sharp steering. Too little steering will leave high probability of the impact, while too much steering will cause the skid or overturn of the vehicle;

Rupture of the forward tire during the sharp turn at high speed requires update of the physical model of the vehicle, and simultaneous application of the breaks and turn, in the proper extent in order to stay in the lane, or, at least, minimize the damage of rolling out of the lane.

Inevitably, in some cases even the best optimal solution possible under the laws of physics, given the current vehicle capabilities, road conditions, speed and location of all the participants will result in damage to the vehicle and even endanger the health and lives of the participants. However even in these unfortunate cases there are still the well-defined optimality criteria—minimum risk to the human lives, and damage to the property.

Optimal steering of the vehicle, especially in the reacting to emergency road interrupts, require accurate vehicle model, including model updates for the damaged vehicle: the vehicle with exploded tire has different friction with the road, however it still has to be steered in the controllable way until it is safely stopped on the road shoulders, or in appropriate safe location.

Thus, according to some embodiments of the present invention, we reduced the problem of automatic driver-less vehicle navigation into the following: (1) Obtain the start point (1 a), the destination point (1 b) and the mission priorities (1c). (2) From the mission priorities and prior data, vehicle and environment and traffic model, weather and traffic updates construct the cost function (2a), reflecting the priorities and the available information. (3) Find the optimal path (3a) minimizing the cost function (2a). (4) Drive the vehicle along the optimal path (3a) applying vehicle motion controllers to minimize the cost function (2a). (4) Monitor the environment, and vehicle and maintain the communication in order to timely detect any road interrupt (4a) requiring reaction in driving of the vehicle (4b), or change of the navigation path (4c). (5) Calculate the optimal reaction to a detected road interrupt (4a), minimizing the cost function by solving the equations of motion of the vehicle.

Now let us consider in more details the physical model of the vehicle and its equations of motion. Initial position or start $\vec{X}_S$, to a certain final position or destination $\vec{X}_F$. The position of the vehicle in space is defined by its spatial position $\vec{X}=\{x, y, z\}$ of its center of mass, and angular position $\vec{\Phi}=\{\varphi_1, \varphi_2, \varphi_3\}$ of its rotation relatively to some pre-selected coordinate.

The speed of the vehicle $\vec{V}$ is defined as the derivative of its coordinates with respect to time:

$$\vec{V}(t) = \frac{d\vec{X}(t)}{dt},$$

note that this definition applies to both linear speeds and angular rotational speeds.

Time derivative of vehicle's momentum equals to the net sum of the forces:

$$\frac{d\vec{P}}{dt} = \Sigma_i \vec{f}_i, \tag{44a}$$

Where the momentum is the sum over independent parts of the vehicle and its load, multiplied by their respective speeds: $\vec{P}=\Sigma_i m_i \vec{V}_i$;

For the vehicles possessing rigid construction and the load which movement and displacements relatively to the vehicle are negligible, the rigid body approximation is valid: $\vec{P}=M\vec{V}$; where $M=\Sigma_i m_i$ is the total mass of the vehicle and its load, and $\vec{V}$—is the speed of its center of mass. Note that by scalar M we denote the mass, and by vector $\vec{M}$ the angular momentum. For the vehicles that change their shape and mass distribution, the equations of motion must be applied separately to each moving part of the vehicle and load system.

The angular momentum of the vehicle $\vec{M}$ is defined as $\vec{M}=I\vec{\Omega}$ (47), where $$I = \begin{bmatrix} \Sigma m(y^2+z^2) & -\Sigma mxy & -\Sigma mxz \\ -\Sigma mxy & \Sigma m(x^2+z^2) & -\Sigma myz \\ -\Sigma mzx & -\Sigma mzy & \Sigma m(x^2+y^2) \end{bmatrix} \tag{48a}$$

is the inertia tensor and $$\vec{\Omega} = \frac{d\vec{\Phi}}{dt} = \left\{\frac{d\varphi_1}{dt}, \frac{d\varphi_2}{dt}, \frac{d\varphi_3}{dt}\right\} \tag{49a}$$

is its angular velocity.

The time derivative of the angular momentum $\vec{M}$ equals to the net toque $\vec{K}$ applied to the body:

$$\frac{d\vec{M}}{dt} = \vec{K}; \tag{50a}$$

where the torque is the sum of vector products of all applied forces by vectors towards the point of their application: $\vec{K}=\Sigma \vec{r} \times \vec{f}$ (50b).

The equations presented above describe the motion of the vehicle and can be used to predict its trajectory, and search for optimal control.

However we did not define the specific forces referred in equations (44a) and (50a) and applied by motion actuator on the vehicle.

In the above generic description of the automatic driving system, the default example for consideration was driving of the wheeled car. However the disclosed invention is applicable to automatic driving and driver assistance of many different vehicles and machines capable to of controlled change their position in space. On the system level, the main differences between various types of vehicles and transportation means are the following:

(1) Different transportation media—road; air; water;

(2) Different vehicle types, modes of motion, rules and constrains;

(3) Different forces acting on motion actuators and physical models of the actuators and the vehicle.

Let us now consider some of the functionality of automatic navigation system for the cars. Many examples will be given for a four wheeled private car, operating on the public roads. However the application domain of the disclosed invention is not limited by a car type and environment. It includes other types of the transport operating moving over the ground, such as: tracks, agriculture machines, armored vehicles and tanks, wheeled, tracked and legged machines.

Among the tasks which can be implemented in the system are recognition of the Road signs and traffic lights; recognition of the road, its shoulders, traffic direction, obstacles and bumps, speed limits, car signal lights—turns, breaks; pedestrians and animals crossing, road interrupts which are the situations requiring immediate change in the speed and or steering; Communication systems used in the autonomous navigation system may include GPS system, GLONASS and other satellite navigation systems, radio traffic and weather updates, car to car, car to road infrastructure communication.

Figure 1:
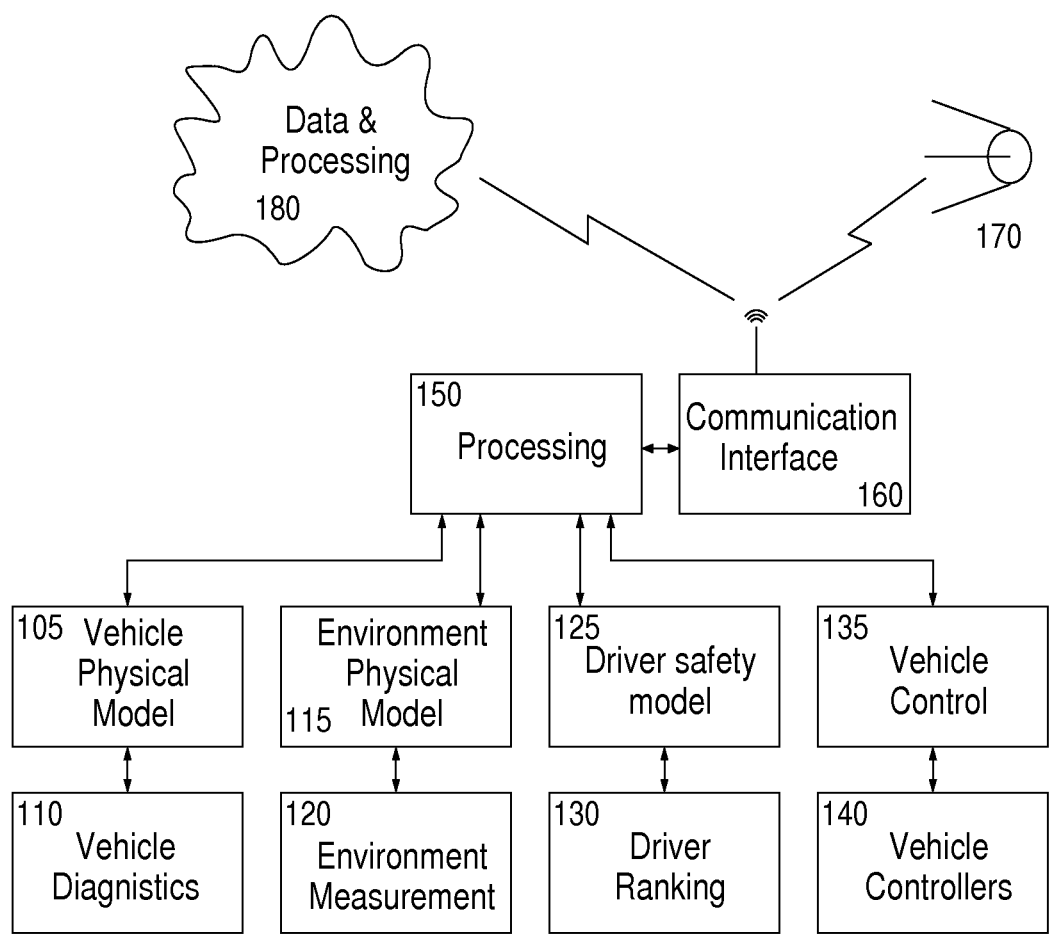
FIG. 1 shows a block diagram of an exemplary system for autonomous vehicle navigation.

For these cases motion actuators of the vehicle are based mostly on the friction with the road or surface. Air and wind usually have secondary and less important influence, except for high speeds of the car and strong winds. For the legged walking machines—the reaction between the legs and surface, friction, maximum force supported by the leg should be evaluated from the microenvironment model, surface model, friction measurement and estimation, load on the leg can be calculated or measured by built in sensors; change of moment of inertia, center of mass, shape and moments of forces applied to the vehicle due leg extension and evaluated and considered in the equations of motion. FIG. 1 shows a block diagram of an exemplary system for autonomous vehicle navigation;

It comprises blocks for physical models of the vehicle 105, environment 115, driver safety 125, which includes the position of the driver and passengers within the vehicle, and driver alertness level; and vehicle control model 135, as well as the blocks representing the sensors monitoring vehicle 110, environment 120, driver 130, and vehicle controllers 140.

The processing unit 150 performs the necessary computations, and its operation will be explained later in details; The processing unit receives the data from Vehicle Physical Model 105 and Vehicle Diagnostics sensors 110; Environment Physical model 115 and Environment Measurement sensors 120; Driver, Passengers and load safety model and sensors; And sends control commands to Vehicle controllers 135 through the Vehicle Control module 140.

Block 160 denotes all the communication interface, including receiving the signals from satellite navigation systems, sending the data towards the further processing at 180, as well as receiving the requested data and processing results.

FIG. 2 represents the block diagram of physical model of the vehicle and its diagnostic sensors. 210 represents the physical model of the vehicle for solution and simulation of equations of motion. The mass and Inertia Tensor of the vehicle define its response to the applied forces. The vehicle mass can be known in advance, calculated or measured. For car it is the sum of the weights applied to each wheel, for the airplane it is the weight before the takeoff offset by the weight of the used fuel. Tensor of inertia is calculated by (48a) from the 3 dimensional mass distribution within the vehicle, or the known in advance vehicle model, and is updated in accordance with fuel consumption or change of the vehicles shape. Reverse estimation of Tensor of Inertia is done via by reverse solution of the equations (47-50b) from the forces applied by motion controllers, and known change in the vehicle motion.

220 denotes the geometric model of the vehicle, and its convex hull, which is necessary to estimate potential collisions. Structural integrity of the vehicle is preserved via preventing the collisions, accelerations and forces acting on the vehicle. Airplane piloting can serve a good example, since there are maximum speeds, accelerations, loads which may depend on state of flaps, gear, speed and other parameters which must be maintained in order to guarantee the vehicle integrity.

230 denotes the engines, motion controllers, their diagnostic, maintenance, fuel level etc. The engine sensors together with engine modeling and information processing allows the diagnostic and maintenance of the engine on the level earlier unachievable by human drivers: the engine diagnostic may include the measurement of pressure, noise, vibration levels, temperature, pressures of oil, fuel, air, thrust as a function of engine RPM, fuel consumption, amounts of air and other parameters. These combined measurement and processing of the obtained data along the engine operation will allow the early diagnostic of any potential engine problems, failure prediction as well as accurate and timely maintenance of the engine. For example the change of air, oil or fuel filters in the prior art engines was usually performed according to the operation hours, however in the disclosed method the maintenance is based on the monitored diagnostic parameters, and integrated operating hours factored by the engine loads, and conditions. For example operating the engine under accelerated loads, stresses, in the dusty air, and/or with abnormal and near abnormal indications of oil, fuel pressure, noise levels, vibrations and/or other operation diagnostics will cause recommendation for earlier maintenance, or earlier engine check. This automatic diagnostics, and its continuous logging will result in more prolonged, reliable, environmentally friendly and safer engine operation.

240 denotes other controls of the vehicle, and their sensors, diagnostics, and feedbacks. Among the vehicle controls referred here are steering wheel, and brakes of the car; udders, engines, bow thrusters and sails of the boats; rudders, elevators, ailerons, flaps, steering and breaks of the wheels of the airplane, and many other motion controls that will be obvious for a person skilled in the art for any particular vehicle.

250 is the model of the microenvironment, which is the model of the physical environment in the vehicle's adjacent vicinity, necessary for planning of the current motion, modelling of the response of the motion actuators, search for and prediction of road interrupts and planning of the maneuvering. For the wheeled vehicle the microenvironment may include the 3 dimensional map of the road and the terrain currently surrounding the vehicle, quality and state of the road and terrain surface (e.g. type of surface, if it is wet, icy, covered by snow, dust, gravel, sand, etc.) estimates of the friction coefficients, wind force and direction, precipitation. The microenvironment model includes all the vehicles, people, objects and animals which are close enough to have a chance to interfere with the vehicle's motion.

Now let us consider several specific vehicles. Home utility robot is the robotic vehicle capable to operate, without domain limitation, in the human residential apartment. The operation purposes, among the other, may include cleaning of the apartment, picking up the dirty dishes from the dinner table and delivering them into the dishwasher machine, picking up the scattered dirty clothes and delivering them into the washing machine etc. The microenvironment for home robot is the layout of the apartment, and the specific room in which the robot is currently located, Location of the humans, pets, furniture and other obstacles. Location of mission-related objects, such as dirt, dirty plates, laundry or others.

For the drone the microenvironment can include the detailed map of its current operation vicinity, as well as the detailed map along the route; received as a weather report, measured, sensed or estimated wind in its nearest vicinity, and along the route. Obstacles, people, animals and objects along the route.

For the airplane the microenvironment in addition to above mentioned information may also include the model of the atmosphere, precipitations, airspace boundaries, air traffic information etc.

For the sailboat the microenvironment may also include the water depth, currents, tide information, and for coping with hard weather it may also include the immediate height speed and position of the adjacent waves, in order to properly orient the boat for best braving of the high seas.

FIG. 3 shows the block diagram of the environment and microenvironment physical model and measuring sensors. It schematically illustrates the use of microenvironment model for the benefit of the vehicle navigation, comfort and safety, as well as for the benefit of other vehicles and users via the update of the map and environment information.

330 denotes the sensors of the vehicle, corresponding to the all the various type of sensors acquiring and measuring the various parameters of the environment and the vehicle, they include the video cameras, 3D scanners, pressure and wind speed measurement sensors, depth meters, radars, sonars; measurements of speed, acceleration, force, vibration, pressures oil, temperature, etc. Their information is acquired, digitized and transferred to microenvironment model 310, vicinity map and model reflecting the positions of the objects, subjects, surfaces, rules, terrain map 320. Both the Microenvironment model 310 and the Vicinity Map 320 contribute into the route planning and possible replanning which is illustrated by "Navigation" in 340. Also both Microenvironment 310 model and Vicinity Map 320 contribute to the "Tactical Motion" 350, which illustrates where the vehicle reactions to the road interrupts are planned and performed. Some of the examples of situations and Tactical Motion responses are: recognition of the bump on the road in front of the car, and maneuver to reduce the speed, and drive around it, if the road and adjacent traffic allow it; reaction to jump of the child or animal onto the road; reaction to a rupture of the tire; tactical motion of the boat in the hard weather to meet the rolling wave at the favorable angle; adjustment of the airplane piloting to the air turbulence, etc.

390 denotes the communication, towards some remote server or the nearby vehicles. This communication can be used, among the other purposes, for reporting the information gathered by the vehicle, and contributing to Vicinity report 380, Map Update 370, Weather report 360, etc. These information reports may include any information regarding the safety, including the emergency or security situations observed by the vehicles cameras and sensors.

Communication 390 may be used to obtain the information from road lights, signs, and other road infrastructure, about the state of the road. Communication 390 may also be used to communicate the state of the vehicle, and/or its navigational intentions to the road infrastructure. possibly for coordination of vehicle speed and infrastructure signals. For example the traffic lights can be synchronized with the vehicle motion so that the vehicle passes the traffic lights at the "green wave", either by adaptation of the vehicle speed, or by adaptation of the traffic light timing of the light changes.

Communication 390 may also be used for vehicle to vehicle communication. Communication 390 may be also used to notify other vehicles about navigational intentions and conditions, to be informed about their intentions and to negotiate maneuvers, such as lane changes, crossing road junctions, mutual collision avoidance and so on. In other words, Communication 390 may be used to coordinate navigation of the vehicle with navigation/movement of other vehicles and/or other vehicle navigation systems, to optimize interaction between the vehicles.

Furthermore, information relating to the environment and/or road, gathered by the vehicle and it sensors can be forwarded to other vehicles, and to the servers for further update of the map, weather, environment reports, emergency reports and other use.

FIG. 4 shows the Driver and load safety model and diagnostic sensors. 450 is the model of the driver, which includes the estimate of his current Competence Level, level of awareness, medical condition, and pose. The current driver Competence Level is a factor reflecting his ability to drive, his alertness to dangers and rapidly unfolding road challenges, and reflects the safety level of the driving. The higher the driver competence the safer is the trip, the higher is the maximum speed at which the driver can safely control the car, and the tougher the road challenges which he can successfully withstand. System awareness for driver medical condition can allow the early diagnostic of medical conditions such as cardiac arrest, stroke, loss of consciousness or other conditions which endanger his life in general, and his immediate driving ability in particular. Finally the driver pose estimation can help for efficient and safe activation of the airbags.

The driver awareness and competence are evaluated from the sensors observing his reactions 410, his consecutive actions upon the vehicle controls 420, to the road challenges observed by 430, the resulting vehicle behavior observed, among the other means, by the load sensors, accelerometers, and video analysis in 450, and from comparing driver reactions to the suggested automatic driving system responses 440.

The driver model 450 allows to set the piloting and speed limits on the car when the human driver controls the car, in accordance with his current competence and awareness level. For the driver with lower awareness, longer reaction time, lower competence levels the maximum speed achievable by the vehicle can be reduced. Furthermore, in the critical situations the driving system can interfere and take the vehicle control in the automatic mode. This interference is done beyond the moment when the estimated driver alertness and competence level will not allow him to successfully response to the road challenge, but yet before the moment when the driving system is still able to successfully response.

According to some embodiments, evaluating driver awareness may include:

background running of vehicle autonomous driving system monitoring the vehicle environment, and determining the events and path sections, determining the vehicle control solutions according to the autonomous driving system;

monitoring the driver behavior/reactions, controls applied by the driver, and the vehicle behavior;

for at least some of the observed environment events determining the delay of the corresponding driver reactions;

evaluating the smoothness and safety of vehicle navigation; and/or comparing driver reactions to autonomous driving system determined reactions.

FIG. 5 shows the Vehicle controller model and vehicle controller's sensors. 510 'Autopilot' denotes the automatic driving system. It receives the inputs from the Vehicle Physical Model, necessary to calculate and model the route and maneuvers; Feedback from the sensors 520 measuring the actual vehicle positions, speed, rotation and acceleration, feedback from motion controllers 530 and 540, allowing to follow the actual forces and actions applied to the vehicle from the controllers.

The hierarchy of processing is shown by the blocks 510, 520, 530. Autopilot 510 denotes the strategic planning and processing—on the level of route planning, detection of road challenges and producing the generic decisions; Vehicle maneuver block 520 responsible for planning of the specific maneuver, and action controller 530 for its execution. They receive the inputs from the Vehicle Physical Model 550, necessary to plan and execute the maneuver according to the vehicle actual capabilities; Motion Controller Model 560, necessary to plan and execute the vehicle motion according to actual capabilities of its motion controllers, which in turn depend on current Microenvironment 570, and calculated according to equations of mechanics, Aero- and/or Hydrodynamics. The working load on the controllers as well as their performance is measured bookkept for failure diagnostic, taking into account actual and not ideal controller performance, and maintenance.

FIG. 6 shows the generic execution flowchart of the automatic driving system. In 610 the system receives the destination and the priorities. The destination can be received by user command, or from another system, via communication. Consider the autonomous vehicle which delivers the food or goods from the store to the living apartment. It receives the destination or entire mission from a home computer, home robot, refrigerator capable to inspect its contents and order the missing supplies, etc. Example of different priorities include priorities for speed, view, price minimization, road safety, etc.

In 620 the route is planned, and the planned route is divided into the smaller sections digestible for detailed planning. Section is the part of the road, short enough to be observed well enough for any obstacles, for detailed planning of vehicle trajectory, and short enough to expect that the road interrupt will probably not change during the vehicles passage along that section.

During the execution of the current section, the road, car and the microenvironment are constantly checked for the appearance of 'Situation Interrupt' 640, which is also referred as 'road challenge', 'challenging situation', 'road interrupt' etc.

The examples of the situation interrupts include jump of the human onto the road; mechanical failure of the car; exploding tire; accident or mistake of the other drivers on the road; sudden unexpected change in the position, speed, of any relevant participant of the traffic on the road; falling stones, building, bridges etc. A detected situation interrupt requires a correction in the vehicles trajectory. The meaning of the 'interrupt' (interruption) is that the search for it is constantly performed, and whenever this interrupt is detected, it receives high priority for immediate system processing and response.

650 denotes the block of trajectory and route verification, where the vehicle position and route are compared to the planned route.

In block 660 the reaction to the possibly detected road interrupt, detected in 640 or route deviation detected in 650 is calculated. It can be a speed reduction, or stopping the vehicle or steering etc. If the vehicle is an airplane, and the situation interrupt is a fire on board, the reaction can be communication to the traffic control and request of the nearest suitable airfield for emergency landing. If the vehicle is a sailboat, and the situation interrupt is a man over board, than the reaction may include notification of human crew, speed reduction, notification of all the nearby ships, and maneuver towards the man-over-board. If the vehicle is the wheeled vehicle during a sharp turn in the mountain road, and the situation interrupt is the exploded front tire, than the possible reaction may include the speed reduction with simultaneous corrective steering to safely come for the safe protected place, or at least to minimize the penalty in terms of risk to the life and damage of the car.

One of the advantages of automatic system over the human driver is the higher safety level, due to superiority of the system sensors and communications over the senses of the human, due to constant alertness, higher speed of reactions, and capability to calculate the optimal reactions to road challenges limited only by vehicle capabilities within the given microenvironment and the laws of physics.

Finally 680 illustrates the termination of the navigation in 690 when the destination is reached, or continuation along the path through 630 otherwise.

FIG. 7 shows some of the blocks of the automatic driving system implementing the control of the wheeled passenger car. It shows that the Autopilot 750 (Automatic Driving System) receives the inputs for the processing from the road sensors and actuator sensors 710 (e.g. for estimation of traction between the wheels and the road); The Vehicle sensors 710 evaluate the state of the vehicle and its engines, the microenvironment sensors 730 perform the detection of Pedestrians, Vehicles, obstacles, microenvironment measurement and mapping, detection and evaluation of the traffic lights, Road Signs, Traffic Guidance from the traffic control services; the weather broadcasts and other information necessary for trajectory estimation are received in 770. The execution and control of the car motion is done via application of engine thrust, gear, steering wheels and breaks in 770.

FIG. 8 shows some of the blocks of the automatic driving system implementing the control of the home robot. After obtaining a new mission in 810, the route is planned in 820, taking into account the map of operational microenvironment and the sensor data about the obstacles, humans and animals in it. The route is divided into the sequence of steps. During performance of each step 830 the processing of the sensor data allows to detect a possible Mission Interrupt in 840 (also referred to as road challenge/road interrupt/situation interrupt/road situation etc.) The examples of Mission Exception can be a piece of furniture obscuring the route, human or pet crossing the route. If re-routing and re-planning is possible, then the route is updated in 820, otherwise the mission is aborted and the robot is ready for the new mission.

FIG. 9 shows some of the blocks of the automatic driving system implementing the control of the drone. As an example of the drone consider the quad-copter flying drone. However, the figure at least some of the aspects of the figure can relate to flying, sailing, riding drones or vehicles of other kind. Bloc 910 illustrates the continuous tracking of the following problems: search for the obstacles, keeping the dynamic and static balance, and following the trajectory which is defined by the human user or automatic system. Block 920 illustrates the interactive controls applied by the user or external commanding system, Block 930 denotes the processing which integrates both the response to interactive controls 920, and the requirements of Balance, Obstacle avoidance and trajectory following from 920. Finally 940 denotes actuator controls, such as rotors, or other kinds of motion controllers, implementing the results obtained in 930.

FIG. 10 shows some of the blocks of the automatic driving system implementing the control of the airplane. There are several certain aspects specific for the airplane type of the vehicle. One of the aspects is the necessity to maintain the speed above certain minimal speed—the stall speed, because at the speeds below the stall speeds the airplane will not be able to maintain the flight, and will actually fall down. Furthermore, this minimal speed depends on the airplane load and fuel weight, state of the flaps, bank angle, air density etc., where these dependences are known in the art from computations, simulations, and accurate measurements for each specific airplane type.

Other limitations of the airplane navigation are that the limitations of weather, wind, visibility, requirement of certain type of airfields for landing, traffic separation etc. Now let us consider the multi-dimensional space, which dimensions are formed by the various parameters characterizing the state of the airplane and its flight: airplane speed, weight, air density, banking angle, state of the flaps, angle of attack, motor thrust, etc. The dimensionality of this space equals to the number of parameters spanning this space. The safe operation of the airplane is secured only within certain limits of these parameters, which are defined by a certain subspace within this parametric space.

As a further clarification example, the flaps and gear can be extended below certain maximal speed, and the certain minimal speed must be maintained at each level of flaps extension. The safe landing is possible when the touch down performed with the vertical and transverse speed below certain value.

It is within this parametric subspace where the automatic piloting system searches for solutions.

Some of the further aspects of automatic driving system for the airplanes are denoted in FIG. 10: 1015 denotes the traffic Map, 1020 the state of flight control surfaces, such as ailerons, rudder, elevators, and flaps; 1030 denotes the summary of the model related to landing, including the landing descend and limitations on the speeds, decrease rate, weather, etc; 1010 denotes various limitations on the flight mode, 1035 traffic separation, 1040 current position relatively to the traffic map and airports, as well as flight and airplane parameters; finally 1050 denotes the 'phase envelope'—safe subspace of parameter space, as described above.

FIG. 11 illustrates the mechanism of search for optimal navigation solutions on the example of the cost functions drawn as a function of vehicle speed. It is serving to illustrate the disclosed method of search for optimal navigation routes, and optimal navigation maneuvers, including the responses to the road interrupts as the solution to the constrained minimization problem. The problems of constrained minimization are known to the people skilled in the appropriate branches of applied mathematics and physics. First the 'cost function' is constructed, which reflects the criteria of optimality for the given problem, and complies with the physical limitations and characteristics of the vehicle and its environment. 1110 indicates the requirement of minimizing the travel time, and shows that the travel time decreases with the increase of the vehicle speed. 1120 indicates the cost of fines, above the certain speed limit, as well as their rising probability and value. The horizontal arrows indicate the variability of speed limits in different road sections or conditions. 1130 indicates the travel safety, with the risks usually rising with the rise of speed. 1140 indicates the fuel expenses, indicating the rise of fuel consumption with the rise of the speed. Finally, 1150 shows an overall cost function, summarizing the fuel expenses 1140, travel time 1110, potential fines 1120 and safety 1130 of the trip. Horizontal arrows indicate that the curve shape may vary, depending on different factors, such as the road and traffic conditions, driver competency and alertness, or algorithms of the automatic system, vehicle state and conditions, etc. The shape of the curves can be evaluated at different accuracy level, from simple empirical evaluation, to explicit calculations of the physical models of the vehicle and environment. Only the speed dependence of the cost factors is shown, the true optimal solution lies in the multidimensional space spanned by all the control parameters of the vehicle, and is defined and limited by the characteristics of the vehicle, road, traffic and the environment.

According to some embodiments, there may be provided an exemplary autonomous vehicle navigation system (AVNS) for automatically navigating a vehicle, which system may comprise:

a data storage for storing one or more data sets physically describing one or more areas (e.g. maps);
an electronic interface for receiving data relating to the one or more areas from external data sources;
an electronic interface for controlling one or more controls of the vehicle;
an electronic interface for receiving parameters relating to motion of the vehicle from physical sensors;
a navigation processor comprising processing circuitry adapted to determine an initial optimal route for traversing the vehicle from a given point in the one or more areas to another point in the one or more areas by computationally resolving a constrained minimization problem, wherein:
  (i) constraints of the constrained minimization problem are physical capabilities and limits of the vehicle and a physical space within the one or more areas appropriate for traversing the vehicle; and
  (ii) an optimization parameter of the constrained minimization problem is a cost function, which cost function comprises a weighted aggregation of cost values representing each of: safety of the passengers, safety of other people, safety of the vehicle and other property, obedience to traffic regulations, minimizing travel time and minimizing cost;
an electronic communication unit adapted to communicate with public infrastructure, wherein said AVNS may be further adapted to factor traffic light cycles when performing navigational calculations;
an electronic communication unit adapted to communicate with other vehicles wherein said AVNS may be further adapted to factor data received from other vehicles when performing navigational calculations;
a vehicle physical model comprising: a mass of the vehicle, dimensions of the vehicle, mass distribution of the vehicle, moment of inertia of the vehicle, aerodynamic or hydrodynamic properties of the vehicle; wherein said vehicle physical model is used to solve and simulate equations of motion to predict behavior of the vehicle in a particular set of conditions, thereby facilitating control of the vehicle via said electronic interface for controlling one or more controls of the vehicle;
a vehicle motion controllers model used to calculate a signal to send to the one or more controls in order to achieve a given maneuver of the vehicle in a given set of circumstances
a vehicle specific environment model including models of forces being applied by external sources upon the vehicle. According to some embodiments, said vehicle specific environmental model includes models of forces being applied by wind upon the vehicle and the data relating to the one or more areas from external data sources includes a wind direction and speed in the one or more areas. According to some embodiments, said vehicle specific environmental model includes models of forces being applied by waves and current upon the vehicle and the data relating to the one or more areas from external data sources includes wave and current parameters in the one or more areas. According to some embodiments, said vehicle specific environmental model includes models of forces being applied by a road upon the vehicle.

According to some embodiments, determining an initial optimal route includes applying equations of motion to find the vehicle trajectory minimizing said cost function.

According to some embodiments, said navigation processor includes route planning logic and a route execution unit, wherein:
  a. The route planning logic is configured to:
    i. receive: a starting point, a destination point, a map from said data storage, environmental characteristics of an area in the map, and a set of navigation preferences, and ii. construct the initial optimal route, optimal for the vehicle in terms of the received set of navigation preferences.

b. The route execution unit monitors traversal of the vehicle on the initial optimal route, continuously monitoring for interrupts of the initial optimal route, wherein interrupts of the initial optimal route are new circumstances by which a change or modification of the initial optimal route, or its execution, are desired based on a resolution of the constrained minimization problem factoring the new circumstances.

According to some embodiments, said AVNS is adapted to use the electronic interface for controlling one or more controls of the vehicle to cause the vehicle to perform a maneuver in response to the new circumstance.

According to some embodiments, said AVNS is adapted to use the electronic interface for controlling one or more controls of the vehicle to cause the vehicle to traverse the optimal path.

According to some embodiments, said vehicle physical model of the AVNS is configured to factor malfunctions or damage to one or more components of the vehicle when solving and simulating equations of motion to predict behavior of the vehicle in a particular set of conditions;

According to some embodiments, said AVNS is configured to update said vehicle physical model in real time upon occurrence of a malfunction of, or damage to, the vehicle.

According to some embodiments, said AVNS is configured to update said vehicle physical model in real time upon occurrence of a malfunction of, or damage to, the vehicle.

According to some embodiments, said AVNS may be installed in a robot, automobile, sailboat, airplane, etc.

According to some embodiments, there may be provided a method of driver driving ability evaluation comprising:
monitoring an environment of the vehicle and identifying road challenges in a path of the vehicle;
monitoring driver reactions to the identified road challenges and determining reaction times of the driver reactions;
limiting the maximum speed of the vehicle based on the monitored driver reactions and determined reaction times; and/or
evaluating driver awareness states at different times and recording the evaluations.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A system for automatically navigating a vehicle, said system comprising:
a data storage for storing one or more data sets physically describing one or more areas;
physical sensors to continuously obtain parameters relating to motion of the vehicle;
a first electronic interface for receiving data relating to the one or more areas from external data sources;
a second electronic interface for receiving the parameters relating to motion of the vehicle;
a navigation processor comprising processing circuitry adapted to:
continuously calculate and update, based on the parameters and data, a physical vehicle model, a microenvironment model, a driver safety model and a motion control model;
receive a destination and priorities;
determine based on the calculated models and based on the received destination and priorities an initial optimal route for traversing the vehicle from a given point in the one or more areas to another point in the one or more areas by computationally resolving a constrained minimization problem, wherein:
(iii) constraints of the constrained minimization problem are physical capabilities and limits of the vehicle and a physical space within the one or more areas appropriate for traversing the vehicle; and
(iv) an optimization parameter of the constrained minimization problem is a cost function, which cost function comprises a weighted aggregation of cost values representing each of: safety of passengers, safety of other people, safety of the vehicle and other property, obedience to traffic regulations, minimizing travel time and minimizing cost;
divide the initial route into the smaller sections for detailed planning based on the continuously undated models; and
until reaching the destination, perform:
during an execution of a current section, continuously check, based on the continuously updated models, for an appearance of an interruption requiring a correction in the planned route;
in case of an interruption, compare a current position to the planned route, calculate reaction to the interruption based on the continuously updated models and executed reaction; and
at an end of the current section, in case the destination is not reached, move to a next section of the route.

2. The system according to claim 1, wherein determining an initial optimal route includes applying equations of motion to find the vehicle trajectory minimizing said cost function.

3. The system according to claim 1, wherein said navigation processor includes route planning logic and a route execution unit, wherein:
a. The route planning logic is configured to:
i. receive: a starting point, a destination point, a map from said data storage, environmental characteristics of an area in the map, and a set of navigation preferences, and
ii. construct the initial optimal route, optimal for the vehicle in terms of the received set of navigation preferences;
b. the route execution unit monitors traversal of the vehicle on the initial optimal route, continuously monitoring for interrupts of the initial optimal route, wherein interrupts of the initial optimal route are new circumstances by which a change or modification of the initial optimal route, or its execution, are desired based on a resolution of the constrained minimization problem factoring the new circumstances.

4. The system according to claim 1, further comprising a fourth electronic interface for controlling one or more controls of the vehicle.

5. The system according to claim 3, further comprising a fourth electronic interface for controlling one or more controls of the vehicle and wherein said system is adapted to use said fourth electronic interface to cause the vehicle to perform a maneuver in response to the new circumstance.

6. The system according to claim 4, wherein said system is adapted to use said fourth electronic interface to cause the vehicle to traverse the optimal path.

7. The system according to claim 6, wherein said system includes a vehicle physical model, a vehicle motion controllers model and a vehicle specific environment model, wherein:
   a. said vehicle physical model comprises: a mass of the vehicle, dimensions of the vehicle, mass distribution of the vehicle, moment of inertia of the vehicle, aerodynamic or hydrodynamic properties of the vehicle;
   b. said vehicle physical model is used to solve and simulate equations of motion to predict behavior of the vehicle in a particular set of conditions, thereby facilitating control of the vehicle via said fourth electronic interface;
   c. said motion controllers model is used to calculate a signal to send to the one or more controls in order to achieve a given maneuver of the vehicle in a given set of circumstances; and
   d. said vehicle specific environmental model includes models of forces being applied by external sources upon the vehicle.

8. The system according to claim 7, wherein said vehicle physical model is configured to factor malfunctions or damage to one or more components of the vehicle when solving and simulating equations of motion to predict behavior of the vehicle in a particular set of conditions.

9. The system according to claim 8, wherein said system is configured to update said vehicle physical model in real time upon occurrence of a malfunction of, or damage to, the vehicle.

10. The system according to claim 7, wherein said vehicle specific environmental model includes models of forces being applied by wind upon the vehicle and the data relating to the one or more areas from external data sources includes a wind direction and speed in the one or more areas.

11. The system according to claim 7, wherein said vehicle specific environmental model includes models of forces being applied by waves and current upon the vehicle and the data relating to the one or more areas from external data sources includes wave and current parameters in the one or more areas.

12. The system according to claim 7, wherein said vehicle specific environmental model includes models of forces being applied by a road upon the vehicle.

13. The system according to claim 1, wherein the vehicle is a robot.

14. The system according to claim 1, wherein the vehicle is an automobile.

15. The system according to claim 1, wherein the vehicle is a sailboat.

16. The system according to claim 1, wherein the vehicle is an airplane.

17. The system according to claim 1, further comprising an electronic communication unit adapted to communicate with public infrastructure, wherein said system is further adapted to factor traffic light cycles when performing navigational calculations.

18. The system according to claim 1, further comprising an electronic communication unit adapted to communicate with other vehicles and said system is further adapted to factor data received from other vehicles when performing navigational calculations.

19. A method for automatically navigating a vehicle, comprising:
   receiving from a data storage, data sets physically describing one or more areas;
   receiving from external data sources, data relating to the one or more areas;
   continuously obtaining by physical sensors parameters relating to motion of the vehicle;
   continuously calculating and updating, based on the parameters and data, a physical vehicle model, a microenvironment model, a driver safety model and a motion control model;
   receiving a destination and priorities;
   determining based on the calculated models and based on the received destination and priorities an initial optimal route for traversing the vehicle from a given point in the one or more areas to another point in the one or more areas by computationally resolving a constrained minimization problem, wherein:
      (iii) constraints of the constrained minimization problem are physical capabilities and limits of the vehicle and a physical space within the one or more areas appropriate for traversing the vehicle; and
      (iv) an optimization parameter of the constrained minimization problem is a cost function, which cost function comprises a weighted aggregation of cost values representing each of: safety of passengers, safety of other people, safety of the vehicle and other property, obedience to traffic regulations, minimizing travel time and minimizing cost;
   dividing the initial route into the smaller sections for detailed planning based on the continuously updated models; and
   until reaching the destination, performing:
      during an execution of a current section, continuously checking, based on the continuously updated models, for an appearance of an interruption requiring a correction in the planned route;
      in case of an interruption, comparing a current position to the planned route, calculate reaction to the interruption based on the continuously updated models and executing reaction; and
      at an end of the current section, in case the destination is not reached, moving to a next section of the route.

* * * * *